(12) United States Patent
Engel et al.

(10) Patent No.: US 8,154,234 B2
(45) Date of Patent: Apr. 10, 2012

(54) RELIABLE DRIVE CUT OFF DEVICE

(75) Inventors: Markus Engel, Nürnberg (DE); Jürgen Lieske, Gremsdorf (DE)

(73) Assignee: Siemens Aktiengesellschaft, Munich (DE)

( * ) Notice: Subject to any disclaimer, the term of this patent is extended or adjusted under 35 U.S.C. 154(b) by 670 days.

(21) Appl. No.: 12/302,938

(22) PCT Filed: May 31, 2006

(86) PCT No.: PCT/DE2006/000973
§ 371 (c)(1),
(2), (4) Date: Dec. 1, 2008

(87) PCT Pub. No.: WO2007/137540
PCT Pub. Date: Dec. 6, 2007

(65) Prior Publication Data
US 2009/0256510 A1   Oct. 15, 2009

(51) Int. Cl.
*H02H 7/08* (2006.01)
(52) U.S. Cl. ........ 318/400.21; 318/34; 318/38; 318/135
(58) Field of Classification Search .............. 318/400.21, 318/135, 38, 34
See application file for complete search history.

(56) References Cited

U.S. PATENT DOCUMENTS

| | | | |
|---|---|---|---|
| 4,454,457 A * | 6/1984 | Nakamura et al. | 318/135 |
| 5,861,683 A * | 1/1999 | Engel et al. | 307/38 |
| 6,411,049 B1 | 6/2002 | Fischperer | |
| 6,788,508 B2 * | 9/2004 | Papallo et al. | 361/64 |
| 6,904,549 B2 | 6/2005 | Jurisch et al. | |

FOREIGN PATENT DOCUMENTS

| | | |
|---|---|---|
| DE | 10139318 A1 | 2/2003 |
| EP | 1050427 A2 | 11/2000 |
| WO | 9942320 A1 | 8/1999 |

OTHER PUBLICATIONS

Blank et al., "Abtrieb und Energieversorgung des Transrapid—Propulsion System and Power Supply for the Transrapid" ZEVrail—Glasers Annalen, Georg Siemens Verlag, Berlin, DE, Bd. 127, Oct. 2003, pp. 70-82, 84, XP001172194.

Materne et al., "Die Fahrwegseitige Sicherung und Steuerung des Transrapid" Signal + Draht, Telzlaff Verlag GmbH, Darmstadt, DE, Bd. 89, No. 7/8, Jul. 1997 pp. 23-27, XP000779781—Statement of Relevance.

* cited by examiner

*Primary Examiner* — Walter Benson
*Assistant Examiner* — David Luo
(74) *Attorney, Agent, or Firm* — Laurence A. Greenberg; Werner H. Stemer; Ralph E. Locher

(57) ABSTRACT

A protective device enables reliably cutting a drive region off the power supply of a guided vehicle. The drive region is connectible to the power supply via at least one drive region switch and it comprises stator sections that are strung together. The sections are connectible to a drive region supply line by way of a stator section switch. The protective device has a control unit for opening at least one switch in the event of a malfunction. The object is to provide a protective device that is inexpensive and that allows a flexible allocation of the power supply to the drive regions. For this purpose, the control is adapted to open all stator section switches and the one or more drive regions switches in the event of a malfunction.

10 Claims, 3 Drawing Sheets

RELIABLE DRIVE CUT OFF DEVICE

BACKGROUND OF THE INVENTION

Field of the Invention

The invention relates to a protective apparatus for safe isolation of a drive section of a power supply of a tracked vehicle, wherein the drive section can be coupled via at least one drive section switch to the power supply and comprises stator sections which are arranged one behind the other in a chain and can each be connected by means of a stator section switch to a drive section supply line, and wherein the protective apparatus has a control unit for opening at least one switch in the event of a fault.

The invention also relates to an apparatus for driving a tracked vehicle having drive sections which are arranged one behind the other in a chain, wherein each drive section can be coupled via at least one drive section switch to the power supply and comprises stator sections which are arranged one behind the other in a chain and can each be connected by means of a stator section switch to a drive section supply line.

The invention furthermore relates to a method for isolation of a drive section of a tracked vehicle from a power supply which is provided by at least one converter.

A protective apparatus such as this, an apparatus such as this and a method such as this are already known from the common prior art. By way of example, FIG. 1 illustrates one already known apparatus for driving a magnetic levitation vehicle.

Figure 1:
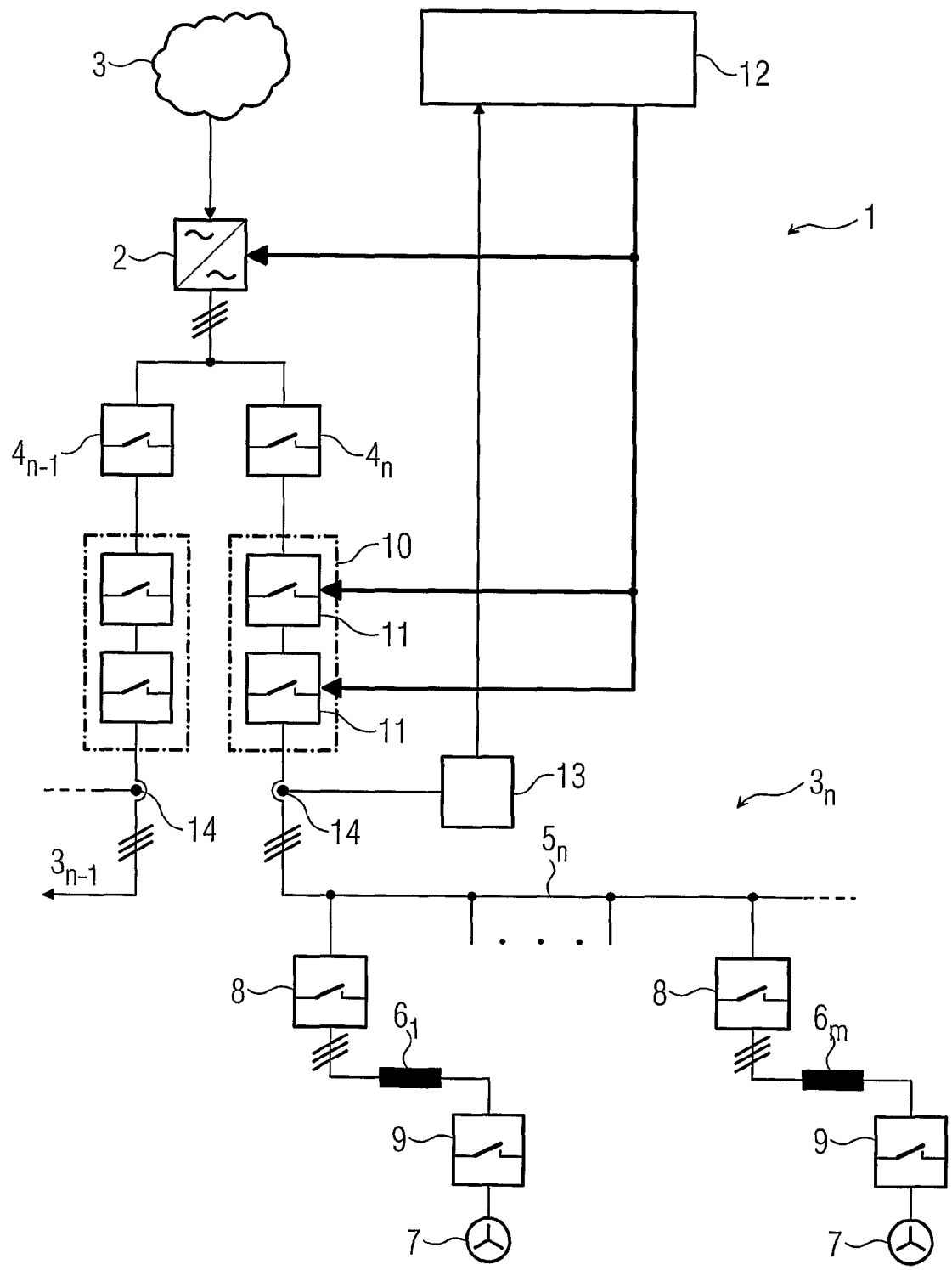

The known apparatus 1 shown in FIG. 1 comprises a converter 2 which is connected to a power-feeding three-phase supply network 3. The drive for the magnetic levitation vehicle is subdivided into track-related drive sections $3_1$, $3_2 \ldots 3_n$ which are arranged one behind the other like a chain. In this case, each drive section $3_n$ can be connected via a drive section switch $4_{n-1}$ or $4_n$ to a respective drive section $3_{n-1}$ or $3_n$, in such a way that a drive section supply line $5_n$ of the respective drive section $3_n$ can be supplied with power. In turn, each drive section $3_n$ likewise has elongated stator sections $6_1$, $6_2 \ldots 6_m$ which are arranged one behind the other in a chain and are likewise in a three-phase form and are connected at one end to a grounded star point 7. So-called stator section switches 8 are used to connect each elongated stator winding $6_1, 6_2 \ldots 6_m$ to the drive section line $5_n$. Furthermore, star-point switches 9 are provided. Current can flow via the elongated stator section $6_1, 6_2 \ldots 6_m$ only when both the respectively associated stator section switch 8 and the respectively associated star-point switch 9 are closed. The drive section switch $4_n$ as well as the elongated stator input switch 8 and the star-point switch 9 are opened and closed in synchronism with the vehicle. This means that the current flows only through the drive section $3_n$ or the elongated stator section $6_m$ in which the vehicle is currently located.

Each drive section $3_n$ can be fed by a single converter 2, as is shown in FIG. 1. As an alternative to this, however, a double feed is also possible, in which each drive section $3_n$ is supplied by two converters.

In order to avoid any risk to personnel as far as possible, the safe disconnection of the power supply is linked to stringent safety requirements. According to the prior art, so-called safe drive disconnection 10 is provided, comprising two series-connected circuit breakers 11. The safe drive disconnection 10 is followed by the respective drive section switch $4_n$, such that the converter 2 shown in FIG. 2 can still be used, after a fault in the drive section $3_n$, to supply power to a sound drive section, such as the drive section $3_{n-1}$. A control unit 12 is provided in order to control the safe drive disconnection and is expediently integrated in an operating control system, which is independent of the control of the converter 2. The control unit 12 acts on the power flow to the drive for safe drive disconnection. In a first step, the power flow of the feeding converter or converters 2 is interrupted. In a second step, the converters 2 are galvanically isolated from the drive section $3_n$ by the safe drive disconnection 10, wherein a monitoring device 13 uses expedient communication lines to signal to the control unit 12 whether any current is still flowing in the drive section $3_n$ or safe drive disconnection has taken place. For this reason, the monitoring unit 13 is connected to an expedient current transformer 14, which is connected downstream from the safe drive disconnection 10. The control unit 12 can subsequently allow power to flow through the converter again, as a result of which the converter 2 is once again available to feed power, for example into the sound drive section $3_{n-1}$. The drive section $3_n$ cannot be connected until the fault has been rectified. The already known drive disconnection shown in FIG. 1 is extremely safe and also allows flexible association of the converters with the respective drive sections. The additional use of two series-connected multipole circuit breakers 11 is, however, costly.

WO 2006/032630 A1 discloses an apparatus for supplying power to a motor for a magnetic levitation railroad. Said apparatus does not require any additional safe drive disconnection in the form of two series-connected circuit breakers. Instead of this, the control device accesses a drive section switch which is connected downstream from the converter in the direction of the power flow. In order to comply with the necessary safety requirement, however, a converter input switch is, furthermore, also operated in the event of a fault, with a short-circuiting device at the same time ensuring that a DC voltage intermediate circuit, which connects the rectifier and inverter of the converter to one another, is discharged. This already known apparatus is subject to the disadvantage that the converter is no longer available for supplying power to other sound drive sections, as a result of the opening of the input switch.

BRIEF SUMMARY OF THE INVENTION

The object of the invention is therefore to provide a protective apparatus, an apparatus and a method of the type mentioned initially which are not only cost-effective but also still allow flexible association of the power supply to the drive sections.

With regard to the protective device mentioned initially, the invention achieves this object in that the control unit is designed to open all the stator section switches and the drive section switch or switches in the event of a fault.

With regard to the apparatus mentioned initially, the invention achieves this object by the apparatus having a protective apparatus such as this.

The invention furthermore achieves the object by a method in which a control unit identifies a fault situation on the basis of measured values and logic which is implemented in it, the control unit then acts on the control of the converters and interrupts the power supply through each converter, then opens stator section switches, which each connect one of the stator sections which are arranged one behind the other in a chain to a drive section supply line, and opens each drive section switch, which connects the drive section supply line to a converter which is associated with the drive section switch, and in which a common indication device transmits the switch position of the stator section switches and of the drive section switches to the control unit, wherein the control unit allows power to be produced by the converter or converters when the stator section switches are open and the drive section switches are open.

The invention is based on the idea that the power supply can also be safely disconnected solely by means of the switches which are provided in any case in a magnetic railroad levitation system. In this case, there is no need whatsoever for the converter to be galvanically isolated from the power supply by an input switch connected upstream of the converter. According to the invention, it is completely sufficient in the event of a fault for all the stator section switches as well as the drive section switch and/or switches to be switched to their respective isolating position. The safety provided in this way of galvanic isolation of the drive section from the supply power is also completely sufficient with regard to the stringent requirement relating to this. The stator section switches as well as the drive section switches are provided in any case, so that no additional costs are incurred in this way. All that is necessary is to use expedient communication and access lines to ensure that the switches are driven by the control unit. However, the costs incurred in doing so remain limited.

According to one advantageous further development of the protective apparatus, at least one common indication device is provided which is connected to each stator section switch and/or to at least one of the drive section switches as well as the control unit, and is designed to indicate the switch position of the switches connected to it. According to this advantageous further development, the monitoring unit which is known from the prior art shown in FIG. 1 is replaced by a common indication device. The common indication device is used to indicate the switch position of all the switches involved in safe drive disconnection. These comprise a drive section switch or, in the case of a double or multiple feed, a plurality of drive section switches, as well as all the stator section switches and possibly further switches, as will be described in more detail in the following text. Only when the common indication device indicates to the control unit that all the switches in the safe drive disconnection process are in the isolating position does the control unit allow power to flow via the converter or converters involved, so that they are available for other drive sections again.

According to a further refinement of the protective apparatus according to the invention, each stator section comprises a polyphase stator winding which is connected to form a star point.

In the conventional magnetic levitation system, a magnetic traveling field is produced by the phases of the winding and drives a magnetic levitation vehicle located in that stator section with it. In this case, the frequency of the alternating current determines the speed of the vehicle.

According to a further refinement of the protective apparatus, star-point switches are provided which are each connected in series with a stator section switch, wherein each stator section is arranged between a star-point switch and a stator section switch. As has already been explained above in conjunction with the prior art, the star-point switch increases the safety in the stator section since current can flow via the stator section, and the magnetic levitation vehicle can thus be driven, only when both the stator section switch and the star-point switch are in their contact position. A possible star point is expediently formed downstream from the star-point switch in the direction of the power flow.

According to one advantageous further development in this context, the control unit is designed to open the star-point switches in the event of a fault. In other words, the star-point switches which are normally provided are included in the inventive concept of safe drive disconnections. For this purpose, the control unit also accesses the control inputs of the star-point switches and switches them to their isolating position thus even further enhancing the safety of the overall system.

According to one advantageous further development of the apparatus mentioned initially, each drive section is connected to a power-feeding converter with the aid of a drive section switch. The drive sections are, for example, fed by a single converter. As an alternative to this, however, a double feed is possible, in which each drive section is connected via a further drive section switch to a further converter. Single and double feeds of a drive section are known per se to a person skilled in the art and therefore do not need to be described at this point. Single and double feeds require only a minor change to the protective concept according to the invention, in the sense, for example, that two common indication devices are provided, which are each connected to all the stator section switches and, if appropriate, all the star-point switches. Each common indication device is in contrast connected to only one drive section switch. It is, of course, also possible to provide only one common indication device even for a double feed for each drive section, which common indication device is connected to all the switches for safe drive disconnection, that is to say to all the drive section switches as well.

According to one advantageous refinement of the method, once the fault situation has been rectified, the control unit allows the drive section switches and the stator section switches and, if required, the star-point switches to be closed, so that normal operation of the magnetic levitation vehicle system can be resumed.

For the purposes of the invention, for example, the control unit represents a part of the operating control system, which is independent of the actual drive, in which case the operating control system is superordinate to the motor and converter control and can in this way act on the converters.

Further expedient refinements and advantages of the invention are the subject matter of the following description of exemplary embodiments of the invention with reference to the figures of the drawing, in which said reference symbols refer to components having the same effect, and in which:

BRIEF DESCRIPTION OF THE SEVERAL
VIEWS OF THE DRAWING

Figure 2:
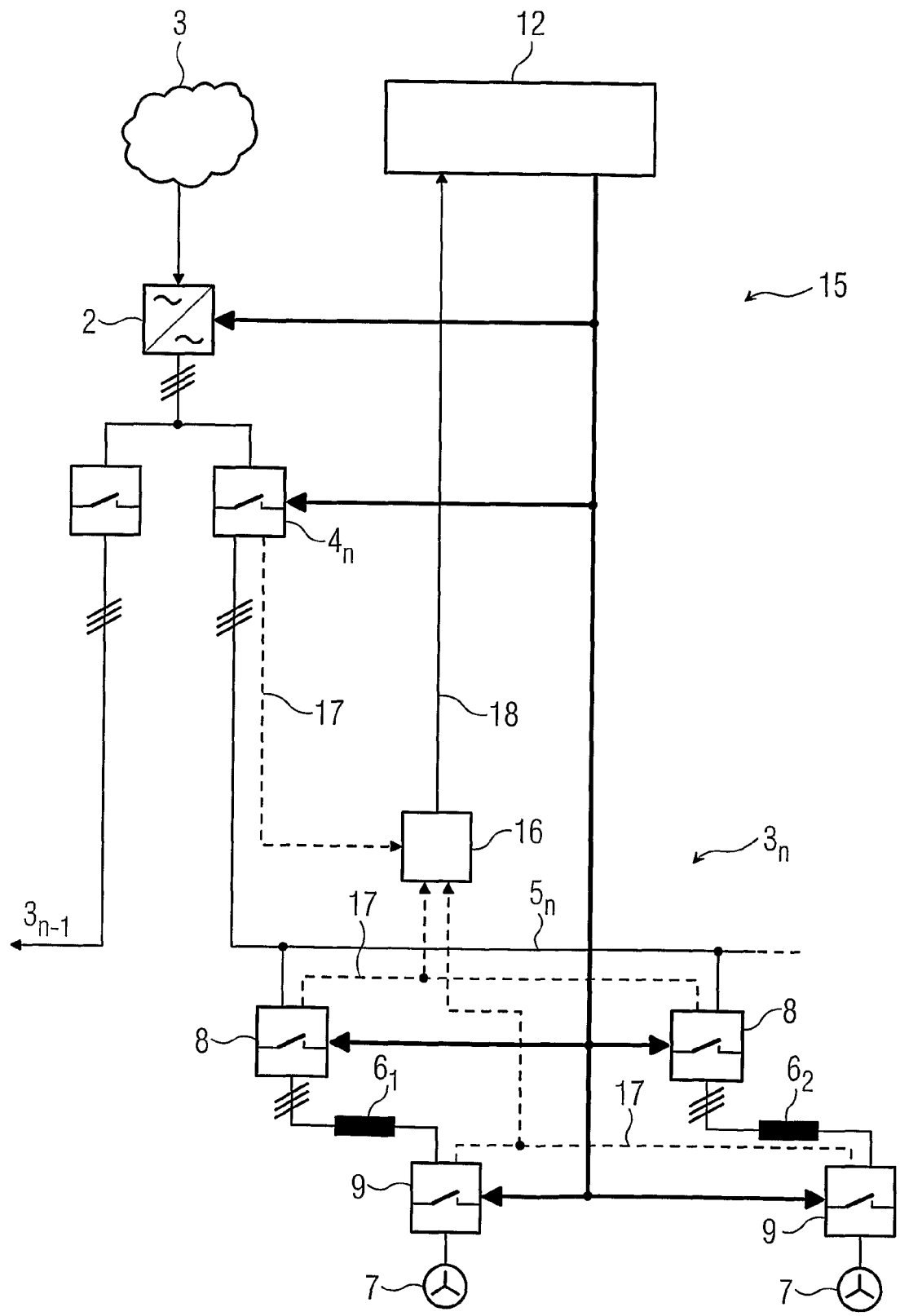
Figure 3:
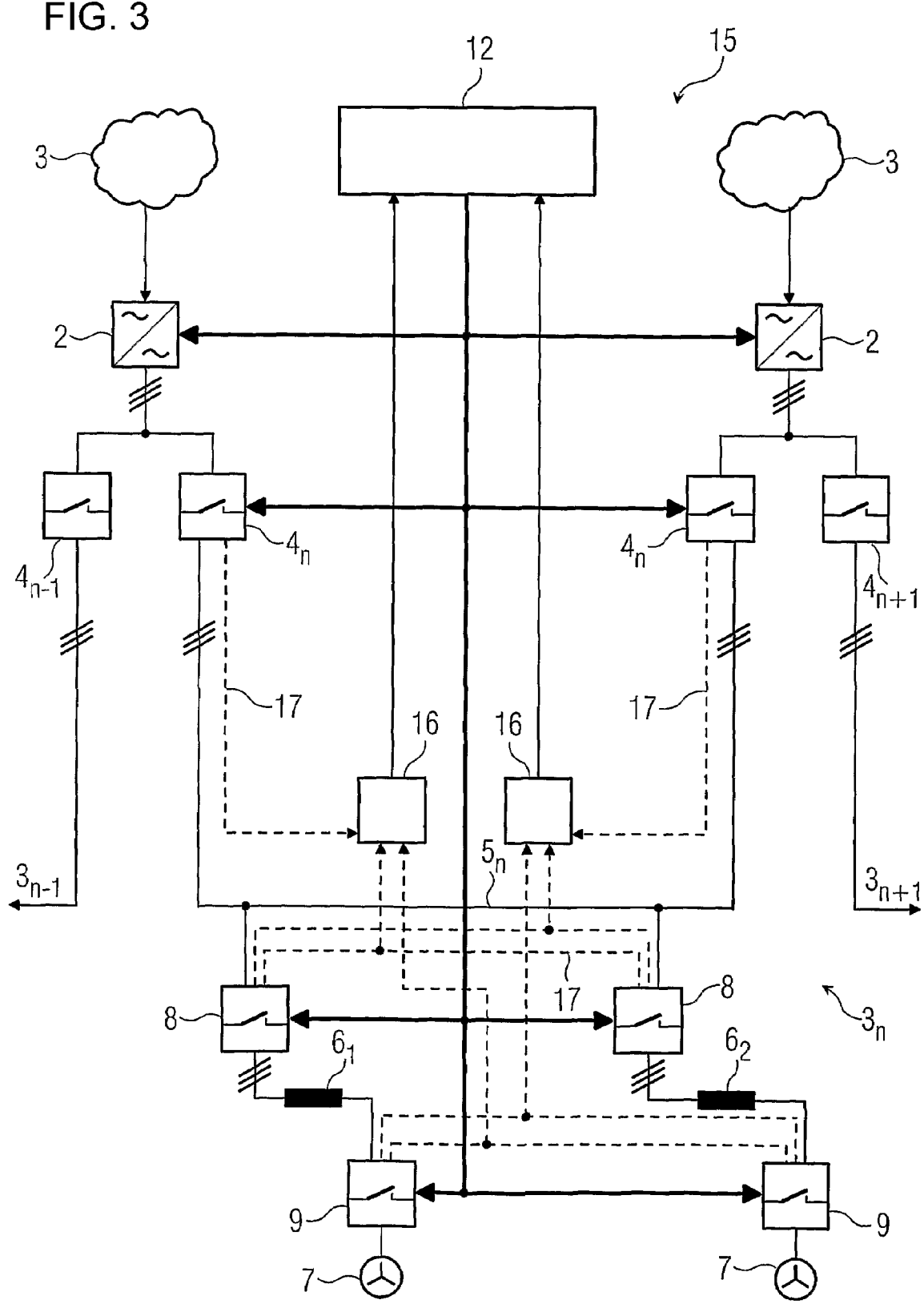

FIG. 1 shows an apparatus for driving a tracked vehicle according to the prior art, FIG. 2 shows one exemplary embodiment of an apparatus according to the invention for driving a tracked vehicle, and FIG. 3 shows a further exemplary embodiment of an apparatus according to the invention for driving a tracked vehicle.

DESCRIPTION OF THE INVENTION

FIG. 1 shows an apparatus for driving a tracked vehicle according to the prior art, as has already been described in detail above.

FIG. 2 shows one exemplary embodiment of an apparatus 15 according to the invention for driving a tracked vehicle. The apparatus has drive sections $3_1$, $3_2$ ... $3_n$ which are arranged one behind the other in a chain, although FIG. 2 illustrates only the drive sections $3_{n-1}$ and $3_n$. Each drive section $3_n$ has a three-phase drive section supply line, which in this case is in the form of a simple three-phase section cable $5_n$. Each section cable $5_n$ is connected via a drive section switch $4_n$ to a power-feeding converter 2 which is supplied with power from a supply network 3. Each drive section $3_n$ is furthermore subdivided into stator sections $6_1$, $6_2$ to $6_m$, although only the stator sections $6_1$ and $6_2$ are shown in FIG. 1. In the same way as that according to the prior art, each stator winding $6_1$ or $6_2$ is arranged between a stator section switch 8 and a star-point switch 9, with each stator section $6_m$ being in the form of a polyphase winding and being connected to form a star point 7. In contrast to the illustrated prior art, safe drive disconnection in the form of two series-connected additional circuit breakers is no longer provided, within the scope of the invention. In fact, for safe drive disconnection, a control unit 12 now accesses all the stator section switches 8 and all the star-point switches 9 of a faulty drive section $3_n$. Communication and connecting lines which are known per se are used for access, so that there is no need to describe these in detail at this point.

Furthermore, the control device 12 is also designed to open the drive section switch $4_n$. A common indication device 16 is provided in order to indicate the switch position of all the switches which are involved in the safe drive disconnection. For this purpose, the common indication device 16 is connected via connecting lines 17, which are shown by dashed lines, to all the stator section switches 8 and to all the star-point switches 9 on the one hand, and to the drive section switches $4_n$ on the other hand.

In the event of a fault, the control unit 12, for example a subroutine of the operating control system, which is independent of the motor and converter control, accesses the converter 2, and uses expedient control commands for converter control to interrupt the power flow via the converter 2. The control unit 12 then accesses the drive section switches $4_n$ as well as all the stator section switches 8 and all the star-point switches 9. As soon as the common indication device 16 signals to the control unit 12 via the communication line 18 that all the switches $4_n$, 8, 9 are in their isolating position, the control unit 12 allows the converter 2 to produce power, which is then once again available for the sound drive section $3_{n-1}$.

FIG. 3 shows a further exemplary embodiment of the apparatus 15 according to the invention. In contrast to the exemplary embodiment shown in FIG. 2, in the apparatus shown in FIG. 3, each drive section $3_1, 3_2 \ldots 3_n$ has two drive section switches $4_n$, so that each drive section $3_1, 3_2 \ldots 3_n$ can be supplied with power by two converters at the same time. The current flow in the drive section supply line $5_n$ is thus reduced, resulting in reduced energy losses. In the case of a double feed, the control unit 12 is connected via expedient control and communication lines to both converters 2 for the drive section $3_n$ and to both drive section switches $4_n$, and in the event of a fault interrupts the power flow through the converters for the respective drive section, for example $3_n$. For this purpose, the control unit 12 once again controls the converters appropriately. Both drive section switches $4_n$ as well as all the stator section switches 8 and all the star-point switches 9 are then opened. Two common indication devices 16 are provided in order to indicate the switch position, with each common indication device 16 being connected to all the stator section switches 8 and to all the star-point switches 9. However, each common indication device 16 is coupled to only one drive section switch $4_n$. In a different exemplary embodiment, only one common indication device 16 is provided, which is connected to all the switches, that is to say to each stator section switch 8, to each star-point switch 9 and to each drive section switch $4_n$.

The invention claimed is:

1. A protective apparatus for safe isolation of a drive section of a power supply of a track-bound vehicle, wherein at least one drive section switch is disposed to selectively connect the drive section to the power supply and the drive section includes stator sections disposed one behind another in a chain, and wherein stator section switches are disposed to respectively connect each of the stator sections to a drive section supply line, the protective apparatus comprising:
    a control unit connected to the at least one drive section switch and to the stator section switches, said control unit being configured to open all stator section switches and the at least one drive section switch in the event of a fault;
    at least one common indication device connected to the at least one drive section switch and/or to the stator section switches and configured to at least one of:
        1) indicate the switch position of the at least one drive section switch and/or the stator section switches that are involved in the safe drive disconnection; or
        2) signal to the control device that the at least one drive section switch and/or the stator section switches are in their isolating position.

2. The protective apparatus according to claim 1, wherein the at least one common indication device is connected to each stator section switch and/or to at least one of the drive section switches and to the control unit, said common indication device indicating a switch position of the stator section switches and/or of the drive section switch or switches.

3. The protective apparatus according to claim 1, wherein each stator section comprises a polyphase stator winding connected to form a star point.

4. The protective apparatus according to claim 1, which comprises star-point switches each connected in series with a stator section switch, wherein each stator section is disposed between a star-point switch and a stator section switch.

5. The protective apparatus according to claim 4, wherein said control unit is configured to open said star-point switches in the event of a fault.

6. In an apparatus for driving a track-bound vehicle having drive sections arranged one behind the other in a chain, wherein each drive section can be coupled via at least one section area switch to a power supply and each drive section includes stator sections that are arranged one behind the other in a chain and are each connectible by way of a stator section switch to a drive section supply line, the improvement which comprises a protective apparatus according to claim 1 for safe isolation of a drive section from the power supply.

7. The apparatus according to claim 6, wherein each drive section is connectible by way of a drive section switch to a power-feeding converter.

8. The apparatus according to claim 7, wherein each drive section is connected via a further drive section switch to a further converter.

9. A method for isolation of a drive section of a track-bound vehicle from a power supply provided by at least one converter, the method which comprises the following steps, to be carried out by a control unit:
    identifying a fault situation on the basis of measured values and logic implemented in the control unit;
    subsequently acting with the control unit on the control of the converters and interrupting the power supply through each converter;
    subsequently opening stator section switches, each connecting one stator section of a plurality of stator sections, arranged one behind the other in a chain, to a drive section supply line, and opening each drive section switch, which connects a drive section supply line to a respective converter associated with the drive section switch;

receiving with the control unit switch positions of the stator section switches and of the drive section switches, transmitted from a common indication device; and allowing power to be produced by the converter or converters when the stator section switches are open and the drive section switches are open.

10. The method according to claim 9, wherein, once the fault situation has been rectified, the control unit allows the drive section switches and the stator section switches to be closed.

* * * * *